United States Patent
Lo et al.

(10) Patent No.: US 6,885,806 B2
(45) Date of Patent: Apr. 26, 2005

(54) METHOD OF MAKING AN OPTICAL FIBER ARRAY BY OVERLAPPING STRIPPED PORTIONS OF RIBBON FIBERS

(75) Inventors: Chuen Yuen Lo, Hong Kong (CN); Bernard Nai Wing Leung, Hong Kong (CN); Kwok Chi Hung, Hong Kong (CN)

(73) Assignee: Photonic Manufacturing Service Ltd., Hong Kong (CN)

( * ) Notice: Subject to any disclaimer, the term of this patent is extended or adjusted under 35 U.S.C. 154(b) by 0 days.

(21) Appl. No.: 10/623,895

(22) Filed: Jul. 21, 2003

(65) Prior Publication Data
US 2005/0018992 A1 Jan. 27, 2005

Related U.S. Application Data
(60) Provisional application No. 60/397,311, filed on Jul. 19, 2002.

(51) Int. Cl.[7] .................................................. G02B 6/00
(52) U.S. Cl. ........................................ 385/137; 385/135
(58) Field of Search ................................ 385/137, 135, 385/136, 59, 63, 71

(56) References Cited

U.S. PATENT DOCUMENTS

| | | | |
|---|---|---|---|
| 4,415,347 A | * 11/1983 | Malinge et al. | 65/407 |
| 4,796,970 A | 1/1989 | Reeve et al. | |
| 5,098,459 A | * 3/1992 | Fukuma et al. | 65/410 |
| 6,299,361 B1 | 10/2001 | Sasaki et al. | |
| 2001/0048791 A1 | * 12/2001 | Matsumoto et al. | 385/83 |
| 2002/0051617 A1 | * 5/2002 | Khan et al. | 385/137 |

* cited by examiner

Primary Examiner—C Prasad
(74) Attorney, Agent, or Firm—Heath W. Hoglund

(57) ABSTRACT

Two ribbon cables are partially stripped of their covering to reveal a window of optical fibers. The bare optical fibers are slightly bent and overlapped so that they define an interior channel. A rod is passed through the interior channel to temporarily hold the bare fibers in place. The bare fibers are placed on a v-groove substrate and a cover is pressed on top of the substrate. Adhesives are applied to hold the ribbon cables and bare fibers in place. The bare fibers are cleaved to form a half-pitch optical fiber array.

20 Claims, 9 Drawing Sheets

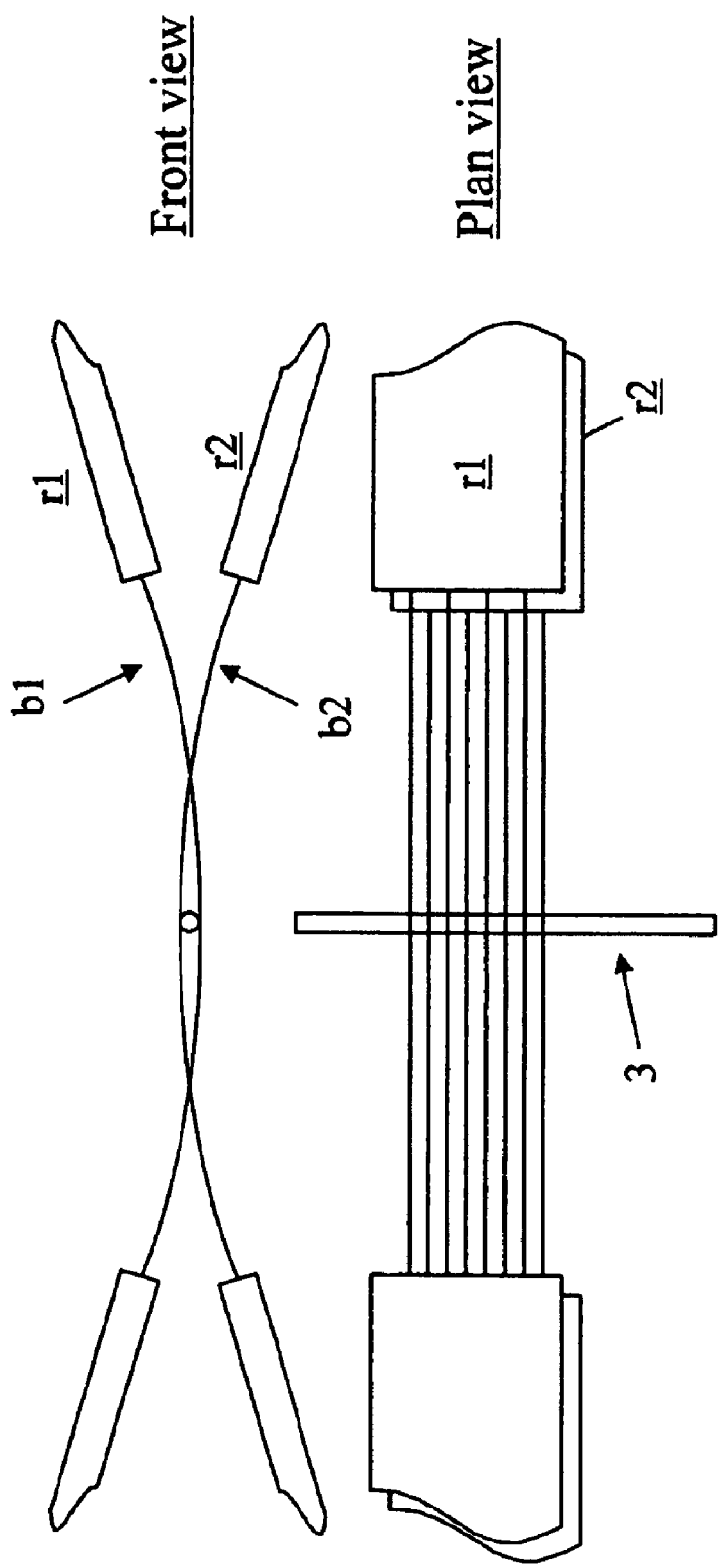

METHOD OF MAKING AN OPTICAL FIBER ARRAY BY OVERLAPPING STRIPPED PORTIONS OF RIBBON FIBERS

CLAIM OF PRIORITY

Applicants claim all of the benefits of priority to U.S. provisional application No. 60/397,311, filed Jul. 19, 2002, titled "Method of making an optical fiber array."

BACKGROUND OF THE INVENTION

In order to meet the demand of high-density and high-transmission rate, reduction in component size, and high production scalability, the deployment of Planar Lightwave Circuits (PLC) and related waveguide packaging is undoubtedly the trend in the optical networking industry. An optical fiber array is used for the connection of light input/output ends of optical fibers to a waveguide substrate. Since the alignment accuracy for such a connection requires tolerances at the submicron level, the method of fabrication of the optical fiber array is crucial to achieve and maintain high-product yields of PLC devices. Moreover, to increase the density and reduce the size of the waveguide, efforts are being made to reduce the waveguide pitch and thus the inter-fiber pitch of a fiber array down to 127 μm, which is approximately half of the standard waveguide pitch of 250 μm.

In order to obtain an accurate pitch in an optical fiber array, a v-groove substrate commonly are made by using: (1) wet etching of a Si substrate; (2) slicing of a glass substrate; or (3) molding of a plastic substrate. However, the operation of arranging the bare optical fibers and setting them into the predetermined v-grooves is a very difficult task. For example, FIGS. 1(a)–(b) show the setting of bare fibers 33 into the predetermined v-grooves of substrate 30 for a half-pitch optical array. FIG. 1(a) shows ribbon fibers 31 and 32. Each include four optical fibers 33 surrounded by a coating 34. After removing the coating 34, bare fibers 33' are exposed. However, it is difficult to keep the same inter-fiber pitch without the coating as the fibers tend to separate and spread out. As shown in FIG. 1(b), as the bare fibers 33' are pressed against the substrate 30, the bare fibers 33" do not align with the v-grooves. In other words, some of the bare fibers 33" are positioned outside the v-grooves. In order to guide these loose, bare fibers after removal of the coating, the conventional method is to adopt a positioning guide fixture to arrange the bare fibers so that the inter-fiber pitch is approximately the same as the v-groove pitch of the substrate 30. Unfortunately, however, the positioning guide fixture can require very accurate and sophisticated machinery, which adds extra cost to the manufacturing costs associated with an optical fiber array product.

SUMMARY OF THE INVENTION

According to one aspect of the invention, a method of making an optical fiber array comprising begins by stripping a first middle portion of a first coated optical ribbon fiber so that the first middle portion includes only bare optical fibers that are bounded on each side of the first middle portion by a coated portion of the first coated optical ribbon fiber. A second middle portion of a second coated optical ribbon fiber is stripped so that the second middle portion includes only bare optical fibers that are bounded on each side of the second middle portion by a coated portion of the second coated optical ribbon fiber. The first middle portion of the first coated optical ribbon fiber is overlapped with the second middle portion of the second coated optical ribbon fiber so that the overlapping bare optical fibers of the first and second middle portions alternate between strands of the first coated optical ribbon fiber and strands of the second coated optical ribbon fiber. The first and the second middle portions define an interior channel bounded by the overlapping bare optical fibers. A bar is passed through the interior channel. Then, the overlapping bare optical fibers are positioned on a substrate having a plurality of parallel grooves. A cover is positioned over the overlapping bare optical fibers so that the overlapping bare optical fibers are held in place between the cover and the substrate. The overlapping bare optical fibers are cleaved along an end of the cover and the substrate.

According to another aspect of the invention, a method of making an optical fiber array begins by providing a first ribbon fiber and a second ribbon fiber each having a plurality of optical fibers enclosed within a coating. A portion of the coating is stripped from the first ribbon fiber and the second ribbon fiber to expose the optical fibers. The stripped portion of the first ribbon fiber is overlapped with the stripped portion of the second ribbon fiber so that the optical fibers of the first ribbon fiber intermingle with the optical fibers of the second ribbon fiber. A substrate having a base and an elevated step with a plurality of grooves is provided. The first ribbon fiber and the second ribbon fiber are placed on the substrate so that the exposed optical fibers rest on the plurality of grooves. More specifically, the coated portion of the first ribbon fiber rests on the base of the substrate and the coated portion of the second ribbon fiber rests on the first ribbon fiber. A spacer is placed between the intermingled optical fibers of the first ribbon fiber and the optical fibers of the second ribbon fiber.

According to further aspects of the invention, a cover is provided. The cover is placed on the substrate to hold the plurality of optical fibers in place. The cover and the substrate form an interior passage through which the optical fibers pass and an end at which the interior passage terminates. The bare optical fibers are cleaved at the end formed by the substrate and the cover. The number of fibers and inter-fiber spacing (or pitch) is the same for both optical fibers.

According to further aspects of the invention, a middle portion of the optical fibers is stripped leaving a window exposing bare optical fibers. The first ribbon fiber is flexed in an upward direction so that the first ribbon fiber forms an upward arch and the second ribbon fiber is flexed in a downward direction so that second ribbon fiber forms a downward arch. The portion of the upward arch intersects with and extends above a portion of the downward arch so that the bare optical fibers overlap to define an interior channel. The spacer (a rod) is passed through the interior channel.

According to still another aspect of the invention, a method of making an optical array comprising begins by stripping a middle portion of two ribbon fibers to expose a window of bare optical fibers. The two ribbon fibers have a matching inter-fiber pitch. The bare optical fibers are bent and overlapped to form an interior channel. The overlapping portion of the bare optical fibers have a pitch approximately equal to one half of the matching inter-fiber pitch. A rod is passed through the interior channel. A portion of the bare optical fibers is placed on a substrate having a plurality of parallel grooves that receive the bare optical fibers. The inter-groove pitch is approximately equal to one half of the matching inter-fiber pitch. A cover is placed over the portion of the bare optical fibers on the substrate. An adhesive is applied to hold the bare optical fibers in place. The rod is

BRIEF DESCRIPTION OF THE DRAWINGS

FIG. 2(c) is a side and plan view of the two ribbon fibers r1 and r2 of FIG. 2(b) shown with a rod 3 positioned in the interior channel 20 to separate the bare optical fibers.

DETAILED DESCRIPTION OF THE INVENTION

Preferred embodiments of this invention are described below in detail with reference to the drawings. Referring to FIGS. 2(a)–(g), a preferred method of making a half-pitch optical fiber array is explained.

Preferably, a half-pitch optical fiber array includes a lower v-groove substrate having a base and a step portion. The step portion has v-shaped grooves formed in its surface. The half-pitch optical fiber array also includes a cover that is located above the v-shaped grooves. Bare fibers from a ribbon cable (or ribbon fibers) are placed in the v-shaped grooves. An adhesive fixes the bare fibers in place and holds the ribbon fibers to the base of the substrate.

Figure 1A:
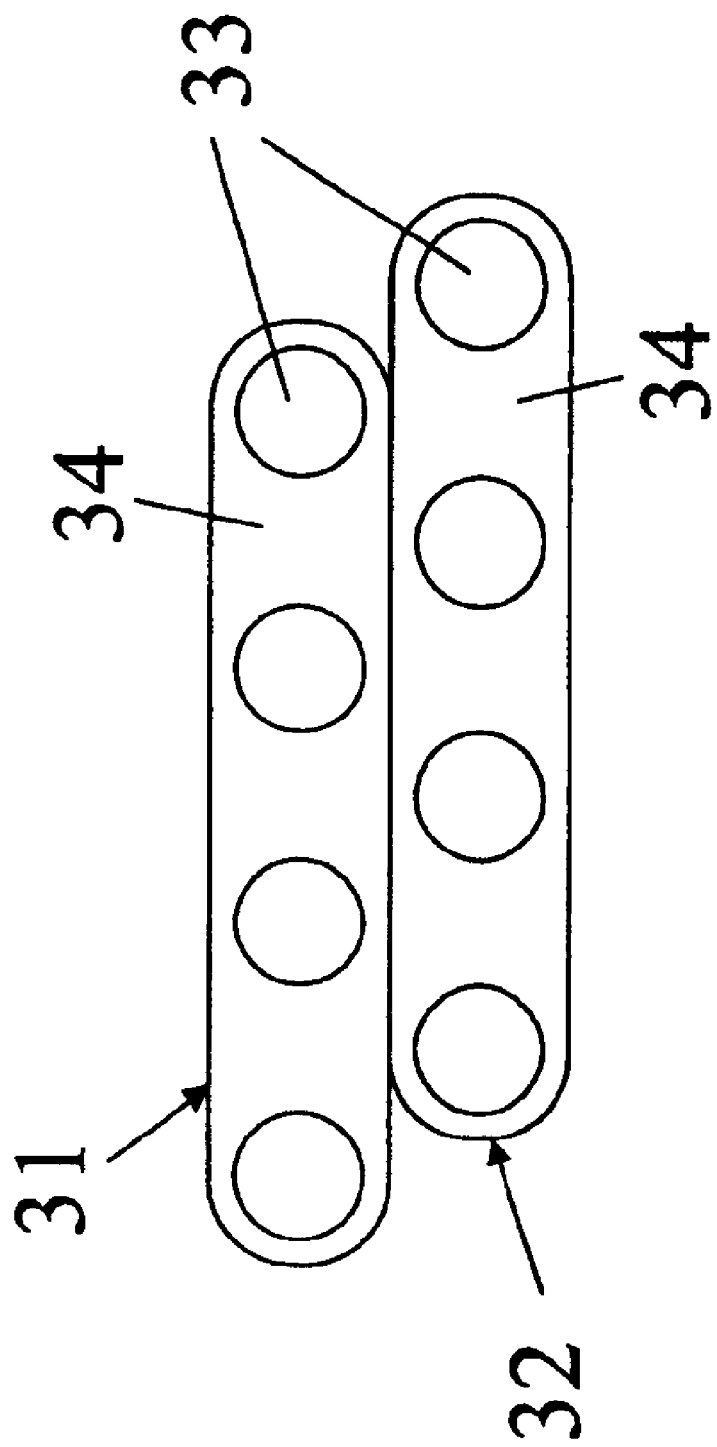
FIG. 1(a) is an end view of two ribbon fibers 31 and 32 illustrating a conventional method of making a half-pitch optical fiber array, with the two ribbon fibers shown before having a portion of the cover removed.
Figure 1B:
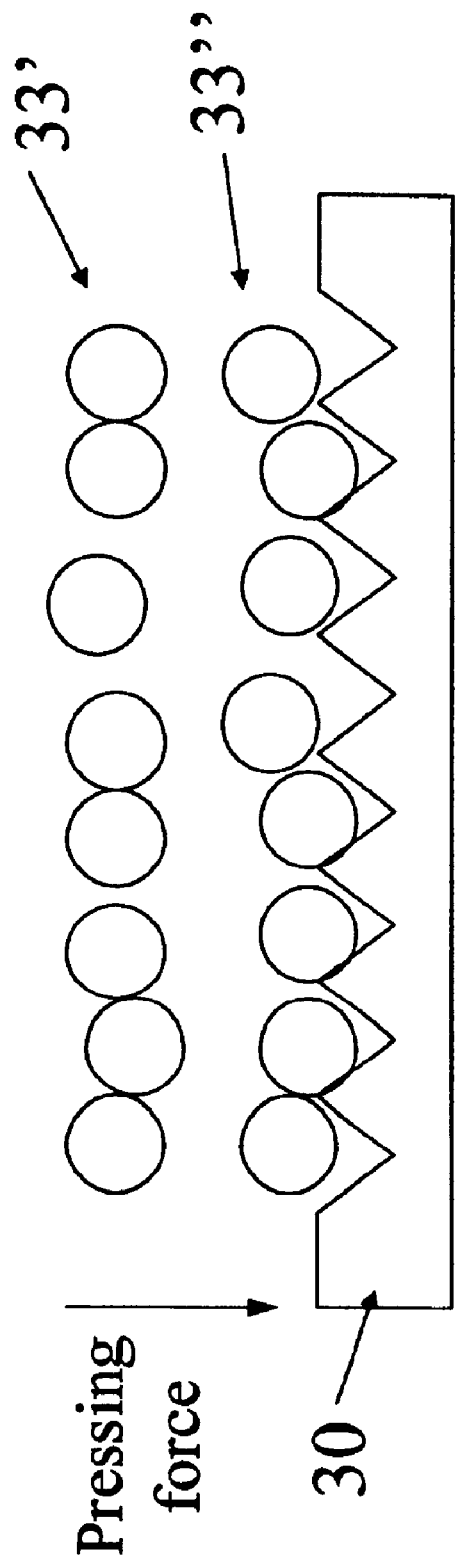
FIG. 1(b) is an end view of two ribbon fibers having an end portion of the cover removed to expose bare optical fibers 33, which are overlapped, and placed on a v-groove substrate 30.
Figure 2A:
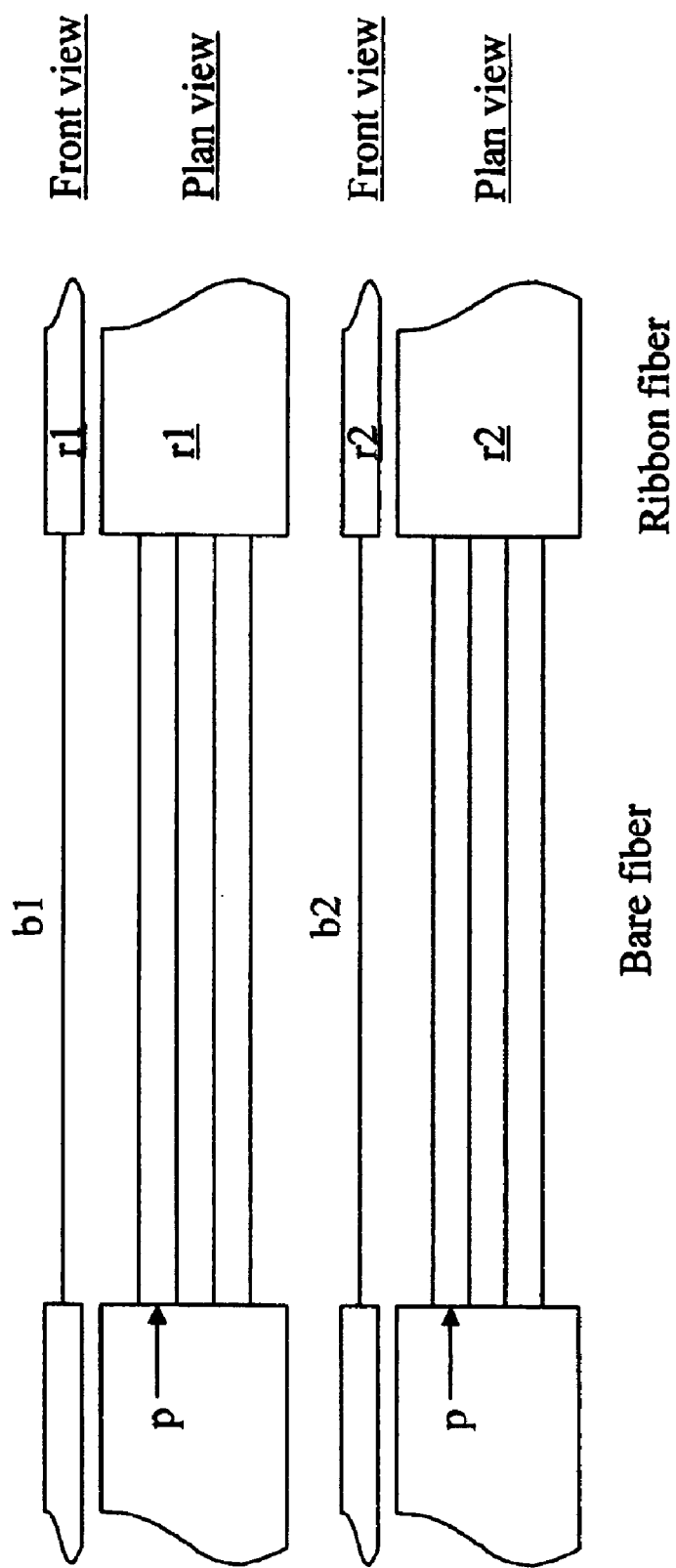
FIG. 2(a) is a side and plan view of two ribbon fibers r1 and r2 stripped of a portion the cover to expose a window of bare optical fibers.

Turning to FIG. 2(a), two ribbon fibers r1 and r2 are shown. These are window-stripped to expose the bare optical fibers b1 and b2. Although the ribbon fibers r1 and r2 as shown include four bare optical fibers each, other ribbon fibers could be used, for example ones with eight, twelve, sixteen, etc. The method for window stripping of the ribbon fibers r1 and r2 can be laser stripping, thermal and mechanical stripping, or chemical etching. The advantage of the window-stripping is that it keeps the inter-fiber pitch p constant. For example, the inter-fiber pitch p as shown is 250 $\mu$m. By stripping a middle portion of the ribbon fibers r1 and r2, the bare fibers b1 and b2 remain fixed at 250 $\mu$m on each end of the bare window.

Figure 2B:
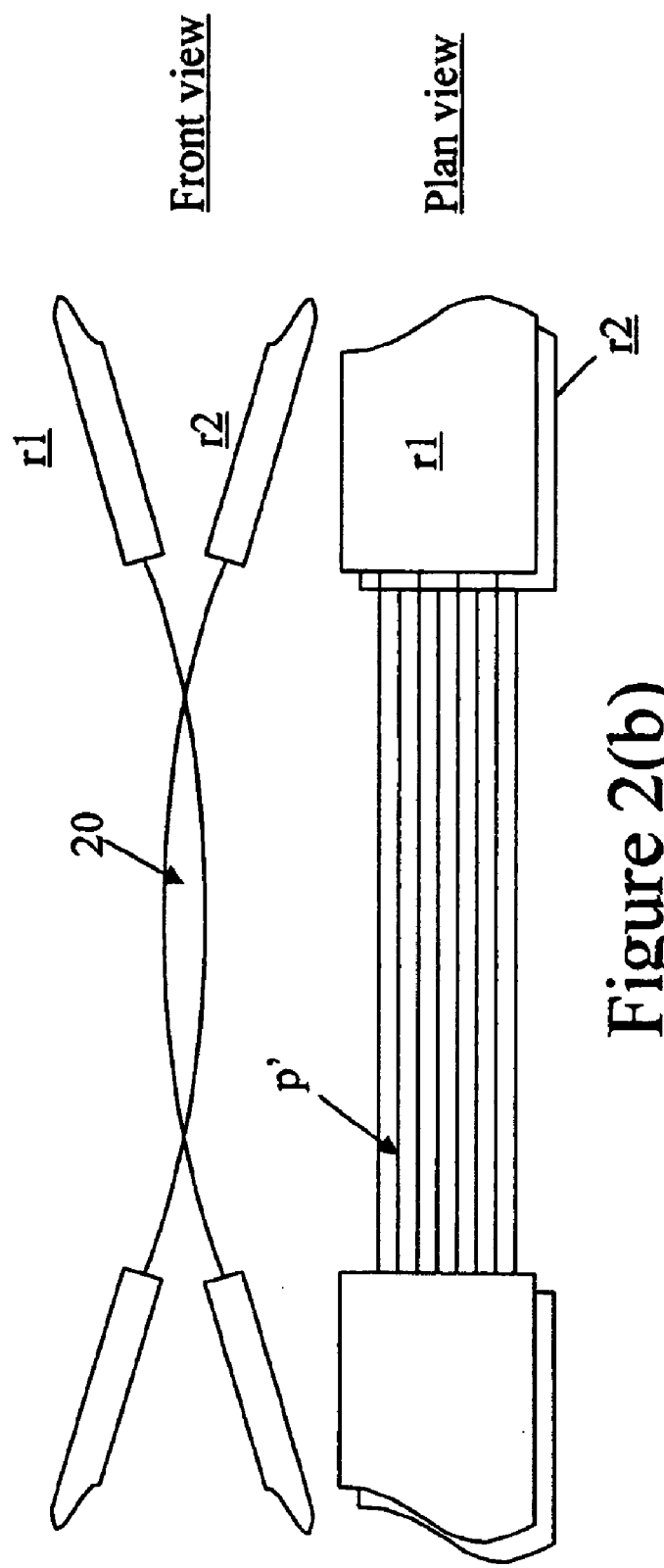
FIG. 2(b) is a side and plan view of the two ribbon fibers r1 and r2 of FIG. 2(a) shown with ribbon fiber r1 flexed in a downward arch and r2 flexed in an upward arch and positioned so that the bare optical fibers of the two ribbon fibers r1 and r2 overlap to define an interior channel 20.

Turning to FIG. 2(b), the ribbon fibers are mutually overlapped and purposely bent so as to array the bare fibers b1 and b2 shown in FIG. 2(b). Specifically, the lower ribbon fiber r2 is bent to form an upward arch and the upper ribbon fiber r1 is bent to form a downward arch. The bare portion of the ribbon fibers r1 and r2 are mutually overlapped so that the upward arch of ribbon fiber r1 extends above the downward arch of ribbon fiber r2 and consequently forms an interior channel 20. In this way, the bare optical fibers alternate between strands from ribbon fiber r1 and ribbon fiber r2 and in the overlapped portion the pitch p' is half of the pitch p of a single ribbon fiber. Thus, the inter-fiber pitch is approximately 125 $\mu$m, which is approximately the same as the v-groove pitch of a preferred v-groove substrate.

Turning to FIG. 2(c), a rigid circular bar 3, such as a fiber, is put into the interior channel 20 between bare fibers b1 and b2. Consequently, the bar 3 runs perpendicular to the axis of the bare fibers b1 and b1. This temporarily holds and guides the intermixed array of bare fibers. Consequently, it is not necessary to use a positioning guide to hold and array the bare fibers. This helps to reduce the manufacturing costs of a half-pitch fiber array and greatly simplifies the manufacturing process.

Figure 2D:
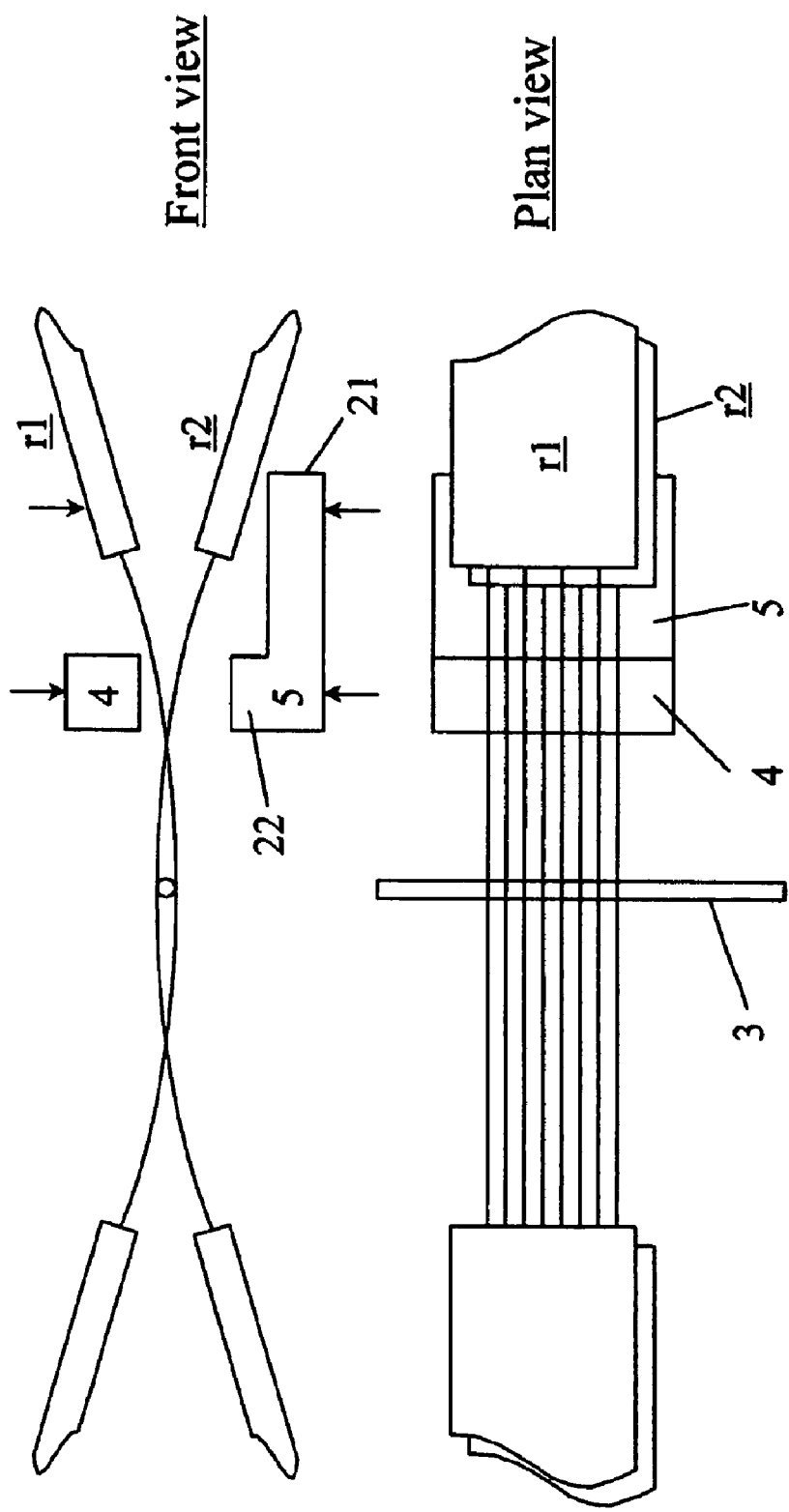
FIG. 2(d) is a side and a plan view of the two ribbon fibers r1 and r2 of FIG. 2(c) shown with the bare optical fibers positioned between a substrate 5 and a cover 4.
Figure 2E:
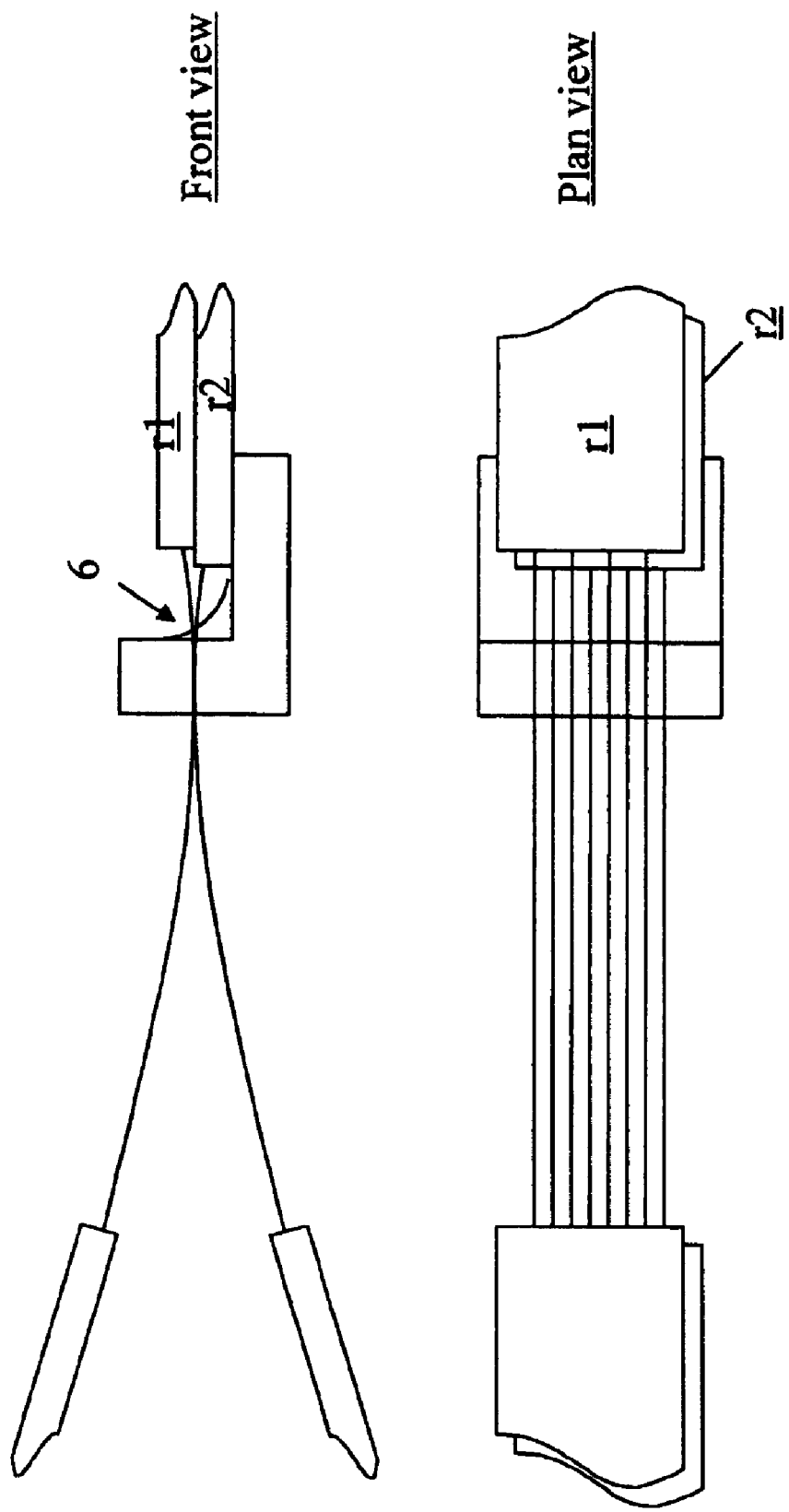
FIG. 2(e) is a side and plan view of the two ribbon fibers r1 and r2 fixed by adhesive 6 between substrate 5 and cover 4 of FIG. 2(d).

Turning to FIG. 2(d), the arrayed bare fibers b1 and b2 are arranged on a substrate 5. The substrate has a base 21 and a step portion 22. The v-shaped grooves are formed in the step portion 22. As the overlapping bare fibers b1 and b2 are positioned in the v-shaped grooves, the covered ribbon fibers r1 and r2 are placed on the base 21. The upper ribbon fiber r1 rests on the lower ribbon fiber r2 and the lower ribbon fiber r2 rests on the base 21. Then, the cover 4, which aligns with the step portion 22, is installed above the v-shaped grooves. The cover is pressed in place and fixes the bare optical fibers b1 and b2 in place. To avoid breaking the fibers, excessive force should not be used.

Figure 2F:
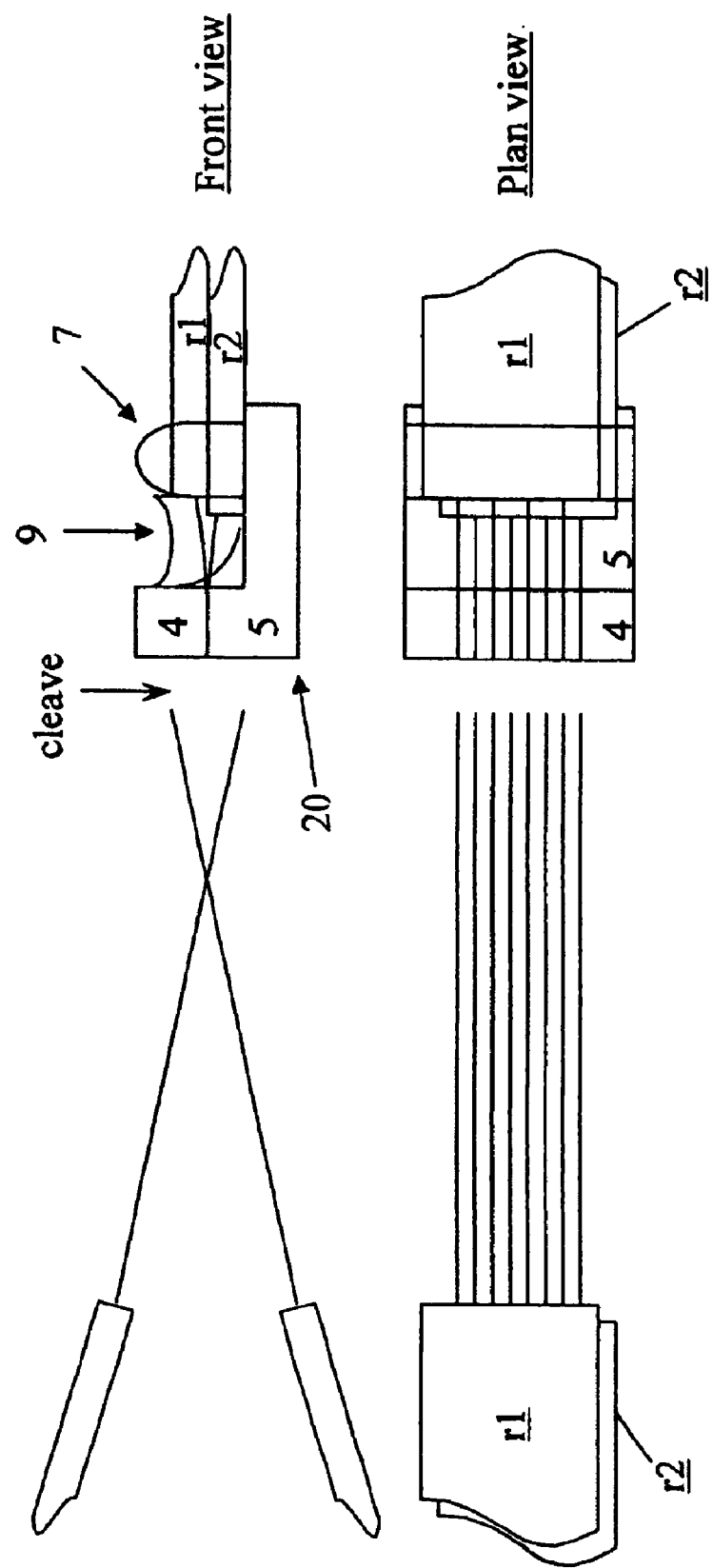
FIG. 2(f) is a side and plan view of the two ribbon fibers r1 and r2 of FIG. 2(e) shown as they are cleaved along an end of substrate 5 and cover 4.

After the bare fibers b1 and b1 have been inserted and located in the v-shaped grooves and the ribbon fibers r1 and r2 have been fixed, the circular bar 3 is removed as shown in 2(e). Adhesive 6 is applied to fill the gap in between the cover lid 4 and the v-groove lower substrate 5 by capillary action. The ribbon fibers r1 and r2 are then fixed using adhesive 7 as shown in FIG. 2(f). Then, the optical fiber array 20 is irradiated with UV rays to harden the adhesive. An UV-curable silicon adhesive 9 fills the gap between cover lid 4 and adhesive 7 to protect the exposed bare fibers b1 and b2.

Figure 2G:
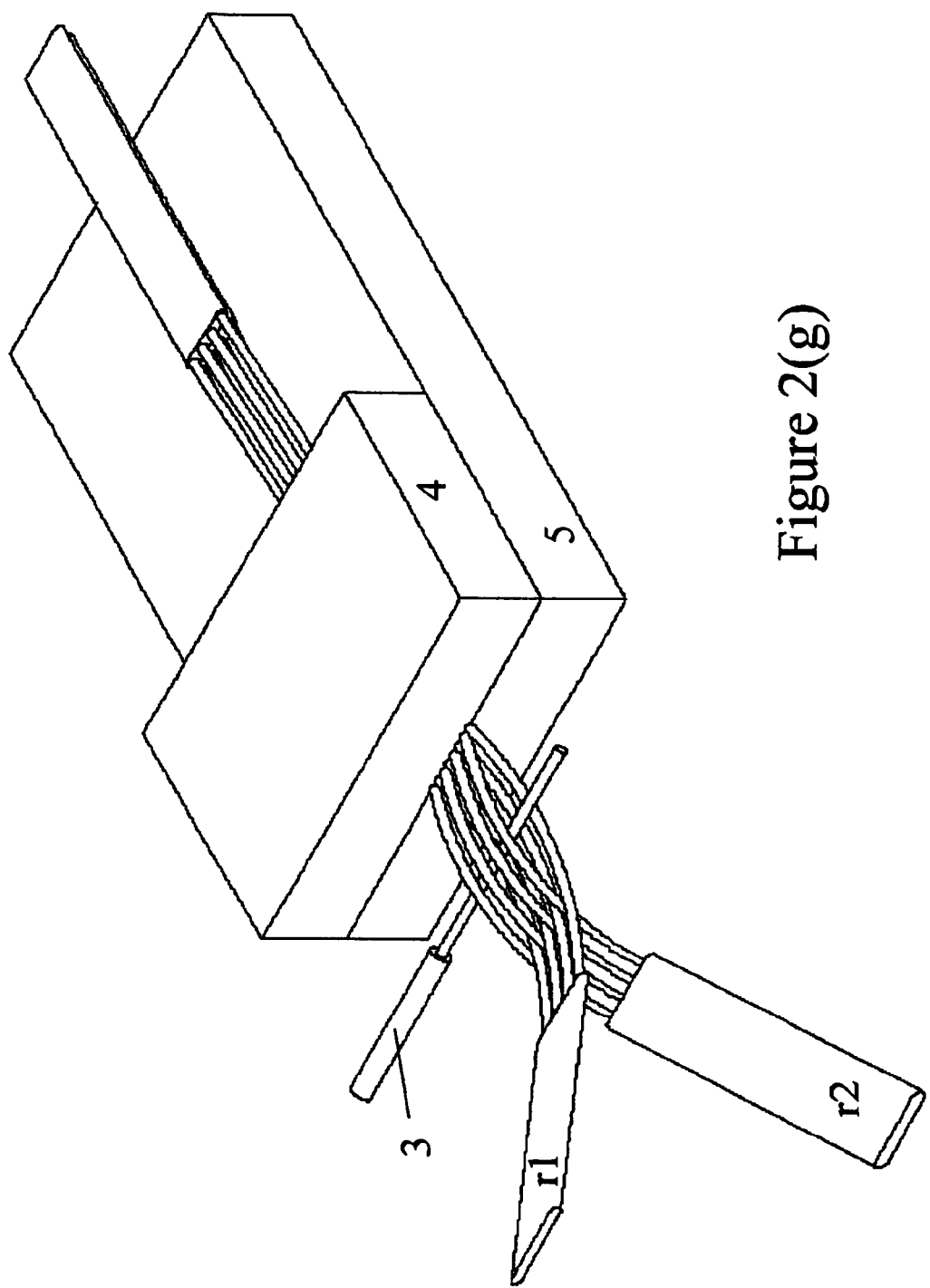
FIG. 2(g) is a perspective view of the ribbon fibers r1 and r2 and substrate 5 (shown without a step) and cover 4 shown with the bare optical fibers bent and overlapping and separated by rod 3.

After hardening of adhesives, the bare fibers b1 and b2 are cleaved as shown in FIG. 2(f). Specifically, the outer end of the array 20 is formed by the step potion 22 and the cover 4. This outer end defines a plane and the bare fibers b1 and b2 are cleaved along this plane. Turning to FIG. 2(g) a perspective view of the arrayed bare optical fibers is shown positioned between the substrate 5 and the cover 4. The rod 3 temporarily holds the array in position.

By using the above-described method of making optical fiber arrays, the bare fibers are easily arranged into the predetermined v-grooves with excellent reproduceablity but without the use of positioning guides or other fixtures. This achieves ease of manufacturing and helps reduce costs associated with making optical fiber arrays. Although the invention has been described above with reference to specific preferred embodiments, those skilled in the art will appreciate that many modifications and variations can be made without departing from the teachings of the invention. All such modification and variation are intended to be encompassed within the scope of the following claims.

We claim:

1. A method of making an optical fiber array comprising the steps of:

stripping a first middle portion of a first coated optical ribbon fiber so that the first middle portion includes only bare optical fibers that are bounded on each side of the first middle portion by a coated portion of the first coated optical ribbon fiber;

stripping a second middle portion of a second coated optical ribbon fiber so that the second middle portion includes only bare optical fibers that are bounded on each side of the second middle portion by a coated portion of the second coated optical ribbon fiber;

overlapping the first middle portion of the first coated optical ribbon fiber with the second middle portion of the second coated optical ribbon fiber so that the overlapping bare optical fibers of the first and second middle portions alternate between strands of the first coated optical ribbon fiber and strands of the second coated optical ribbon fiber and wherein the first and the second middle portions define an interior channel bounded by the overlapping bare optical fibers;

passing a bar through the interior channel;

positioning the overlapping bare optical fibers on a substrate having a plurality of parallel grooves;

positioning a cover over the overlapping bare optical fibers so that the overlapping bare optical fibers are held in place between the cover and the substrate; and cleaving the overlapping bare optical fibers along an end of the cover and the substrate.

2. A method of making an optical fiber array comprising the steps of:

providing a first ribbon fiber and a second ribbon fiber each having a plurality of optical fibers enclosed within a coating;

stripping a portion of the coating from the first ribbon fiber and the second ribbon fiber to expose the optical fibers;

overlapping the stripped portion of the first ribbon fiber with the stripped portion of the second ribbon fiber so that the optical fibers of the first ribbon fiber intermingle with the optical fibers of the second ribbon fiber;

providing a substrate having a plurality of grooves;

placing the first ribbon fiber and the second ribbon fiber on the substrate so that the exposed optical fibers rest on the plurality of grooves; and placing a spacer between the intermingled optical fibers of the first ribbon fiber and the optical fibers of the second ribbon fiber.

3. The method of making an optical fiber array of claim 2, further comprising the steps of:

providing a cover; and placing the cover on the substrate to hold the plurality of optical fibers in place.

4. The method of making an optical fiber array of claim 3, wherein the cover and the substrate form an interior passage through which the optical fibers pass and an end at which the interior passage terminates, and wherein the method further comprises the step of cleaving the optical fibers at the end formed by the substrate and the cover.

5. The method of making an optical fiber array of claim 2, wherein in the step of providing the first ribbon fiber and the second ribbon fiber the number of optical fibers in the first ribbon fiber is the same as the number of optical fibers in the second ribbon fiber and wherein the inter-fiber spacing in the first ribbon fiber is the same as the inter-fiber spacing in the second ribbon fiber.

6. The method of making an optical fiber array of claim 2, wherein the step of stripping the portion of the coating from the first ribbon fiber and the second ribbon fiber comprises stripping a middle portion of the coating to reveal a window exposing a middle portion of the optical fibers.

7. The method of making an optical fiber array of claim 6, wherein the step of stripping the portion of the coating from the first ribbon fiber and the second ribbon fiber comprises chemically etching the coating.

8. The method of making an optical fiber array of claim 6, wherein the step of stripping the portion of the coating from the first ribbon fiber and the second ribbon fiber comprises mechanically removing the coating.

9. The method of making an optical fiber array of claim 6, wherein the step of overlapping comprises overlapping the window of the first ribbon fiber with the window of the second ribbon fiber so that the exposed middle portion of the optical fibers of the first ribbon fiber overlap with the exposed middle portion of the optical fibers of the second ribbon fiber.

10. The method of making an optical fiber array of claim 2, wherein the step of providing the substrate comprises providing a substrate having a base and an elevated step wherein the plurality of grooves are formed in the elevated step.

11. The method of making an optical fiber array of claim 10, wherein the step of placing the first ribbon fiber and the second ribbon fiber on the substrate comprises resting a first coated portion of the first ribbon fiber on the base of the substrate and resting a second coated portion of the second ribbon fiber on the first coated portion of the first ribbon fiber.

12. The method of making an optical fiber array of claim 10, further comprising the steps of providing a cover and joining the cover with the elevated step.

13. The method of making an optical fiber array of claim 2, wherein the step of overlapping comprises flexing the first ribbon fiber in an upward direction so that the first ribbon fiber forms an upward arch and flexing the second ribbon fiber in a downward direction so that second ribbon fiber forms a downward arch and wherein a portion of the upward arch intersects with and extends above a portion of the downward arch.

14. The method of making an optical fiber array of claim 13, wherein the step of overlapping comprises forming an interior channel between the portion of the upward arch that intersects and extends above the portion of the downward arch.

15. The method of making an optical fiber array of claim 14, wherein the step of placing the spacer comprises passing the spacer through the interior channel.

16. The method of making an optical fiber array of claim 14, wherein the step of placing the spacer comprises passing a rod through the interior channel.

17. Them method of making an optical fiber array of claim 4, wherein the step of providing the substrate comprises providing a substrate having a base and an elevated step wherein the plurality of grooves are formed in the elevated step;

the step of placing the first ribbon fiber and the second ribbon fiber on the substrate comprises resting a first coated portion of the first ribbon fiber on the base of the substrate and resting a second coated portion of the second ribbon fiber on the first coated portion of the first ribbon fiber;

the step of placing the cover comprises joining the cover to the elevated step so that the cover and the elevated step form the interior passage through which the optical fibers pass and form the end at which the interior passage terminates.

18. The method of claim 17, wherein the end comprises a plane and wherein the step of cleaving comprises cleaving the optical fibers along the plane of the end.

19. The method of making an optical fiber array of claim 2, wherein:

in the step of providing the first ribbon fiber and the second ribbon fiber the number of optical fibers in the first ribbon fiber is the same as the number of optical fibers in the second ribbon fiber and wherein the inter-fiber spacing in the first ribbon fiber is the same as the inter-fiber spacing in the second ribbon fiber;

the step of stripping the portion of the coating from the first ribbon fiber comprises stripping a middle portion of the coating to reveal a window exposing a middle portion of the optical fibers;

the step of overlapping comprises flexing the first ribbon fiber in an upward direction so that the first ribbon fiber forms an upward arch and flexing the second ribbon fiber in a downward direction so that second ribbon fiber forms a downward arch and wherein a portion of the upward arch intersects with and extends above a portion of the downward arch to form forming an interior channel between the portion of the upward arch that intersects and extends above the portion of the downward arch;

the step of providing the substrate comprises providing a substrate having a base and an elevated step wherein the plurality of grooves are formed in the elevated step;

the step of placing the first ribbon fiber and the second ribbon fiber on the substrate comprises resting a first coated portion of the first ribbon fiber on the base of the substrate and resting a second coated portion of the second ribbon fiber on the first coated portion of the first ribbon fiber; and the step of placing the spacer comprises passing the spacer through the interior channel; and wherein the method further comprises the steps of: providing a cover;

joining the cover to the elevated step so that the cover and the elevated step form the interior passage through which the optical fibers pass and form the end at which the interior passage terminates;

cleaving the optical fibers along a plane formed by the end of the cover and the elevated step.

20. A method of making an optical array comprising the steps of:

stripping a middle portion of two ribbon fibers to expose a window of bare optical fibers wherein the two ribbon fibers have a matching inter-fiber pitch;

bending and overlapping the bare optical fibers to form an interior channel whereby the overlapping portion of the bare optical fibers have a pitch approximately equal to one half of the matching inter-fiber pitch;

passing a rod through the interior channel;

placing a portion of the bare optical fibers on a substrate having a plurality of parallel grooves with an inter-groove pitch is approximately equal to one half of the matching inter-fiber pitch, wherein the plurality of parallel grooves receive the bare optical fibers;

placing a cover over the portion of the bare optical fibers on the substrate;

applying an adhesive to hold the bare optical fibers in place;

removing the rod from the interior channel; and cleaving the bare optical fibers.

* * * * *